(12) United States Patent
Gullicksen et al.

(10) Patent No.: US 7,433,593 B1
(45) Date of Patent: Oct. 7, 2008

(54) SWITCHING ALGORITHM FOR OPTICAL FIBER NETWORKS

(75) Inventors: Jeffrey Gullicksen, Mountain View, CA (US); Neena Aluri, Alpharetta, GA (US); Theodore E. Tedijanto, Cupertino, CA (US); William Kish, Saratoga, CA (US)

(73) Assignee: Ciena Corporation, Linthicum, MD (US)

( * ) Notice: Subject to any disclaimer, the term of this patent is extended or adjusted under 35 U.S.C. 154(b) by 665 days.

(21) Appl. No.: 10/608,528

(22) Filed: Jun. 30, 2003

Related U.S. Application Data (60) Provisional application No. 60/392,458, filed on Jun. 28, 2002.

(51) Int. Cl.
*H04B 10/00* (2006.01)
*H04J 14/00* (2006.01)

(52) U.S. Cl. .......................................................... 398/3

(58) Field of Classification Search ...................... 398/2, 398/3, 4, 5, 7
See application file for complete search history.

(56) References Cited

U.S. PATENT DOCUMENTS

| | | | | |
|---|---|---|---|---|
| 5,412,652 A * | 5/1995 | Lu | ............................... | 370/223 |
| 5,647,035 A * | 7/1997 | Cadeddu et al. | ............... | 385/24 |
| 6,246,667 B1 * | 6/2001 | Ballintine et al. | ........... | 370/224 |
| 6,917,759 B2 * | 7/2005 | de Boer et al. | .................. | 398/5 |
| 7,054,558 B2 * | 5/2006 | De Girolamo et al. | ........ | 398/59 |
| 7,072,580 B2 * | 7/2006 | Arecco et al. | .................. | 398/4 |
| 2001/0005358 A1 * | 6/2001 | Shiozawa | .................... | 370/228 |
| 2004/0246892 A1 * | 12/2004 | Elie-Dit-Cosaque et al. | ..... | 370/216 |

OTHER PUBLICATIONS

The Authoritative Dictionary Of IEEE Standards Terms, Standards Infiormation Network IEEE Press; 7th Ed., p. 1183.*
Microsoft Computer Dictionary, Microsoft Press A Division of Microsoft Corporation, 5TH Ed, p. 152.*

* cited by examiner

*Primary Examiner*—Shi K Li
(74) *Attorney, Agent, or Firm*—Clements Bernard Miller; Christopher L. Bernard; Tyler S. Brown (57) ABSTRACT

A method, system and egress switching node for maintaining a network connection in an optical network reduces the number of spans needed for reestablishing a network connection. The invention learns which channels are used by the network connection and propagates such channel assignment data to the switching nodes for storage therein. When a span failure occurs, a notification is sent to the switching nodes identifying which span has failed. The switch nodes use the notification and channel assignment data to perform protection switching such that the rerouted network connection selects the channel that was used by the network connection on the failed span. Likewise, the egress switching node uses the selected channel to drop the network connection from the protecting fibers. This enables a network connection to travel a shorter distance after a protection switch.

15 Claims, 10 Drawing Sheets

|  |  | AB | BC | CD | DE | EA |
|---|---|---|---|---|---|---|
| Network Connection 201 | working fiber | — | C3 | ~~C5~~ | C2 | — |
|  | protecting fiber | C5 | C5 | — | C5 | C5 |
| Network Connection 202 | working fiber | C3 | — | — | — | C2 |
|  | protecting fiber | — | — | — | — | — |
| Network Connection XXX | working fiber | — | — | — | — | — |
|  | protecting fiber | — | — | — | — | — |

| | | AB | BC | CD | DE | EA |
|---|---|---|---|---|---|---|
| Network Connection 201 | working fiber | — | ~~C3~~ | ~~C5~~ | ~~C2~~ | — |
| | protecting fiber | C5 | — | — | — | C5 |
| Network Connection 202 | working fiber | C3 | — | — | — | C2 |
| | protecting fiber | — | — | — | — | — |
| Network Connection XXX | working fiber | — | — | — | — | — |
| | protecting fiber | — | — | — | — | — |

SWITCHING ALGORITHM FOR OPTICAL FIBER NETWORKS

CROSS REFERENCE TO RELATED APPLICATIONS

This application claims the benefit of priority under 35 U.S.C. § 119(e) to U.S. Provisional Application Ser. No. 60/392,458 filed on Jun. 28, 2002 the entirety of which is hereby incorporated by reference.

TECHNICAL FIELD

This invention relates generally to communication systems that include optical fiber networks as well as switching nodes and control methods for such systems.

BACKGROUND

Optical fiber networks such as optical rings are commonly used in communication systems. Examples of optical fiber rings include unidirectional path switch rings and bi-directional line switch rings. Switching nodes may also be connected in a mesh topology, as in known, and such networks are typically referred to as mesh networks.

Figure 1A:
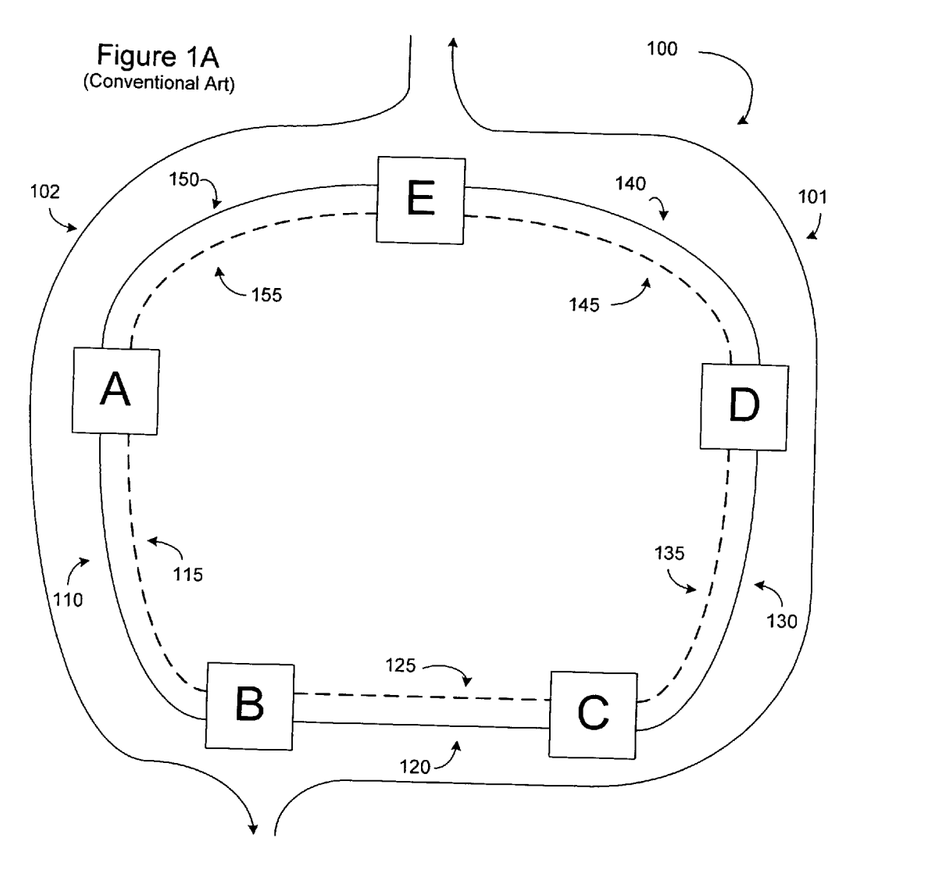
FIG. 1a illustrates network connections 101 and 102 in a conventional bi-directional line switch ring 100.
Figure 1B:
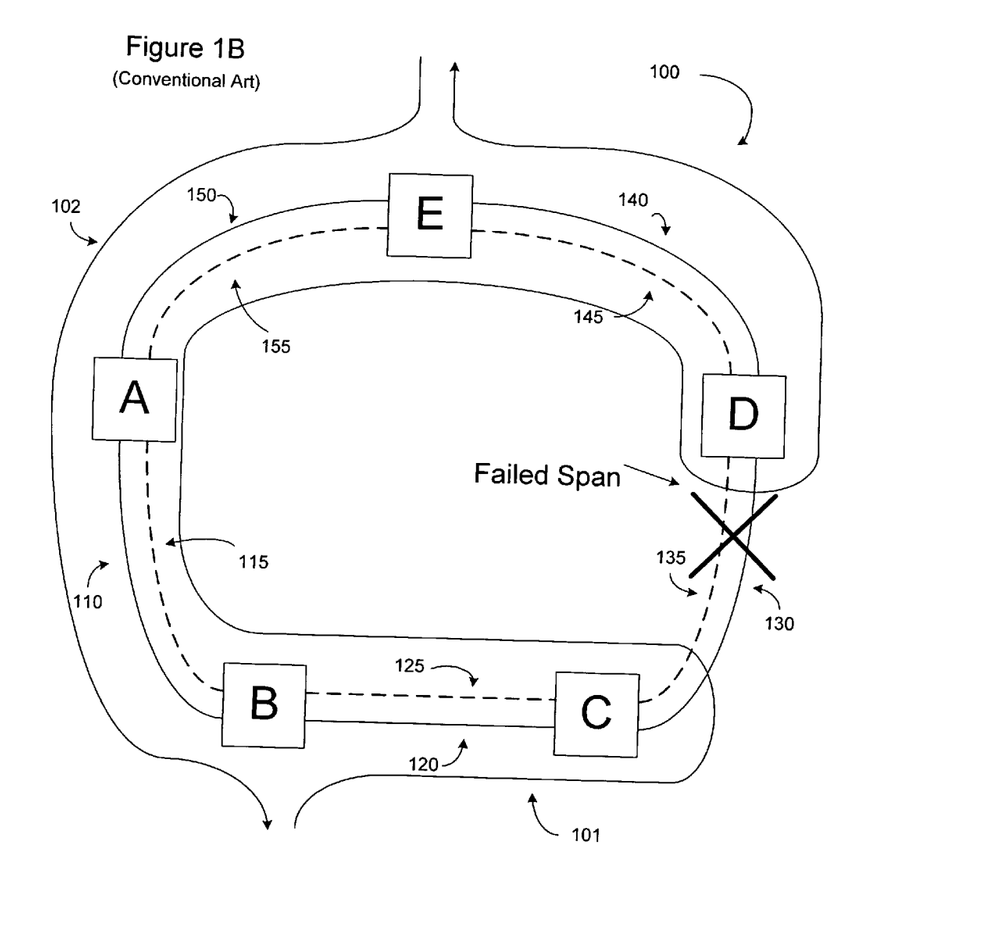
FIG. 1b illustrates network connections 101 and 102 in conventional bi-directional line switch ring 100 after a span failure.

FIGS. 1a and 1b illustrate a bi-directional line switch ring 100 with five switching nodes. The five switching nodes are respectively labeled as A, B, C, D, and E. A fiber span consisting of a working fiber (or pair of fibers) and a protection fiber (or pair of fibers) are provided between any two adjacent nodes. In the figures, dashed lines represent protection fiber, while solid lines represent working fiber.

In FIG. 1a, a network connection 101 is established from switching node B to switching node E, and a network connection 102 is established from switching node E to switching node B. Network connection 101 traverses working fibers 120, 130, and 140. Network connection 102 traverses through working fibers 150 and 110.

Conventional BLSR networks such as the one shown in FIG. 1a utilize the same channel to transmit the network connection around the ring. For example, a first channel would be used to transmit the network connection 101 along the working fibers. If a protection switch event occurs, another channel would be used to transmit the network connection along the protecting fibers but in both cases a single channel is used for the network connection as it traverses the working fibers and a single channel is used for the protecting fibers.

FIG. 1b illustrates that network connection 101 traverses a different path when a span failure occurs between switching nodes C and D. When the span between switching nodes C and D fails, switching node C performs a line switching operation as known in the art to connect working fiber 120 with protection fiber 125, and switching node D performs a line switching operation to connect protection fiber 145 with working fiber 140. After the span failure, the network data traveling from node B to node E on network connection 101 traverses working fiber 120, protection fibers 125, 115, 155, 145, and working fiber 140.

DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The expression "optically communicates" as used herein refers to any connection, coupling, link or the like by which optical signals carried by one optical system element are imparted to the "communicating" element. Such "optically communicating" devices are not necessarily directly connected to one another and may be separated by intermediate optical components or devices. Likewise, the expressions "connection" and "operative connection" as used herein are relative terms and do not require a direct physical connection.

Embodiments of the present invention include methods and systems for maintaining network connections in an optical fiber network such as a ring or mesh network after a span in the optical fiber network fails as well as an egress optical switch that maintains network connections after span failure.

Figure 2A:
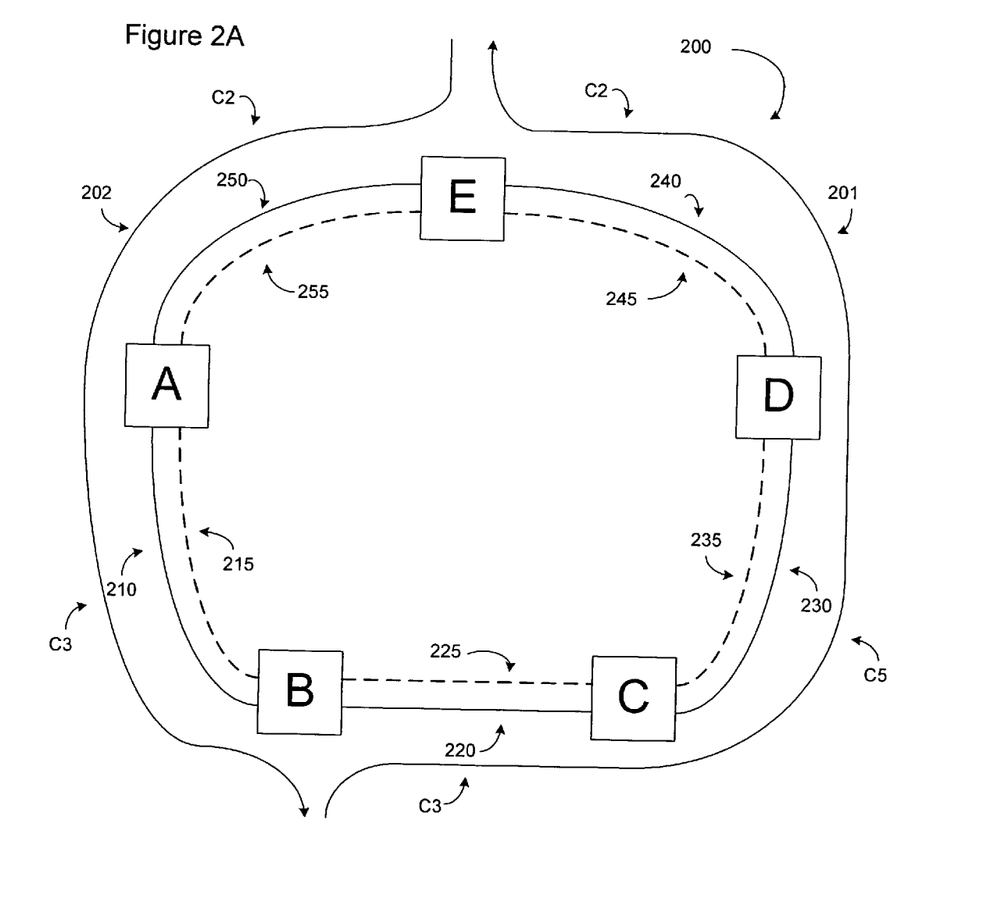
FIG. 2a illustrates the channel assignments for network connections 201 and 202 in bi-directional line switch ring 200 of an embodiment of the present invention.
Figure 2B:
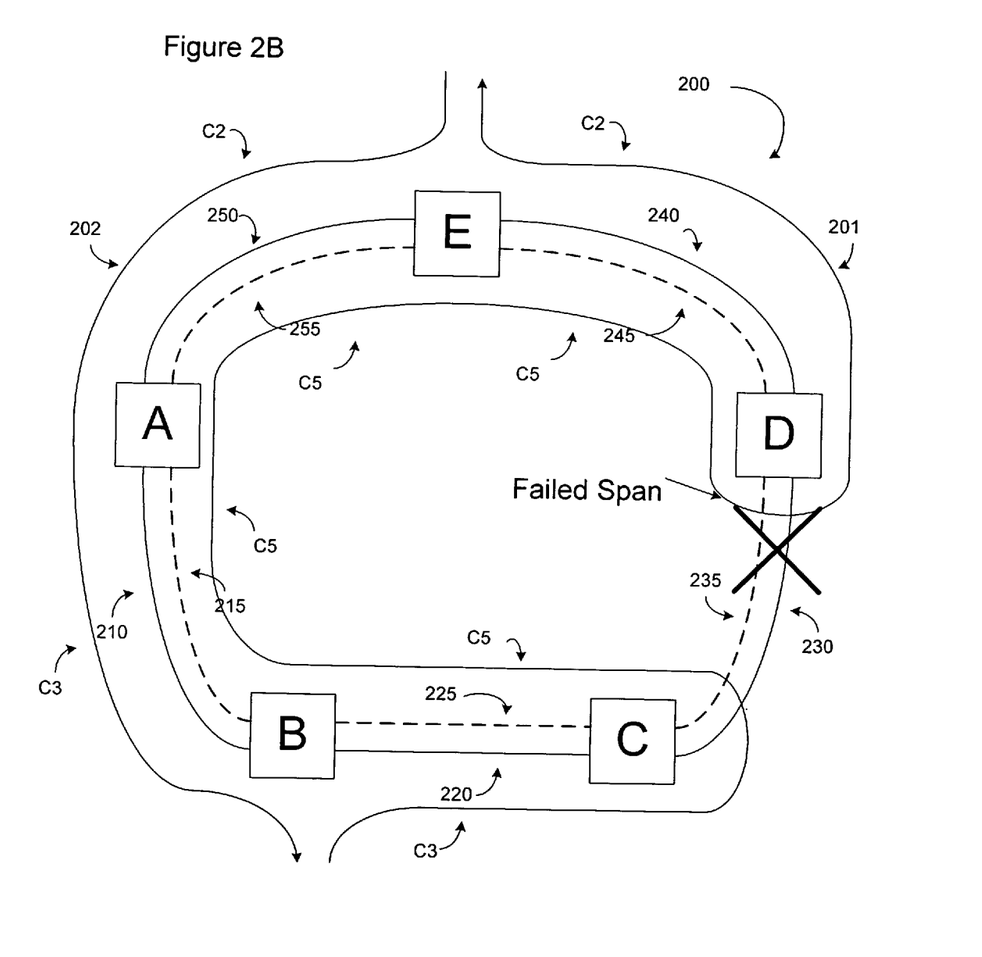
FIG. 2b illustrates the channel assignments in one embodiment of the present invention for network connections 201 and 202 in bi-directional line switch ring 200 after the span between switching nodes C and D fails.
Figure 2C:
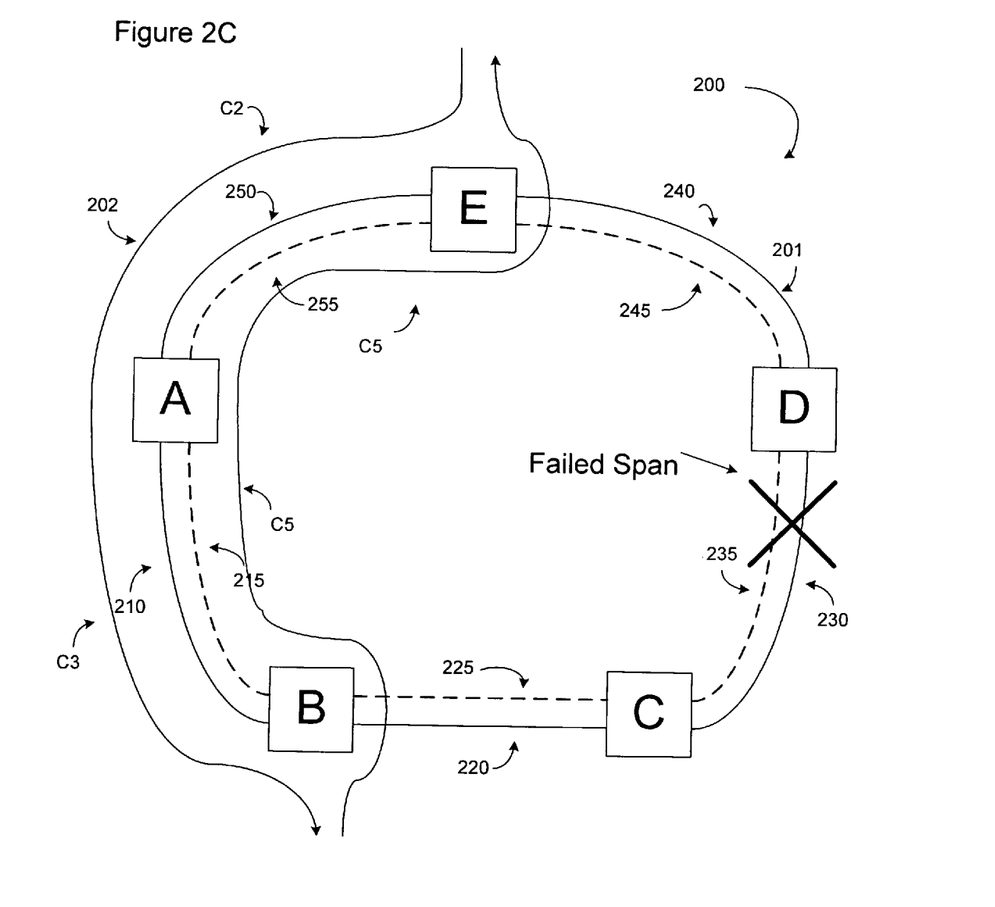
FIG. 2c illustrates the channel assignments in another embodiment of the present invention for network connections 201 and 202 in bi-directional line switch ring 200 after the span between switching nodes C and D fails.

FIGS. 2a-2c illustrate one implementation of the present invention for a bi-directional line switched ring and one implementation of the present invention for a bi-directional transoceanic line switched ring. In FIGS. 2a-2c, bi-directional line switch ring 200 includes five switching nodes, A, B, C, D and E each of which may be generally constructed with known devices such as a CoreDirector® intelligent optical switch but with significant modifications to the control structure thereof as discussed below and diagrammatically illustrated in the figures, particularly FIGS. 4 and 5.

The working fiber and the protection fiber between each adjacent pair of switching nodes can support multiple channels. The multiple channels can be allocated with Time Division Multiplexing ("TDM"), Wavelength Division Multiplexing ("WDM"), TDM over WDM, or Code Divisional Multiplexing ("CDM") techniques. In one implementation, each working fiber or protection fiber supports eight channels c1, c2, c3, c4, c5, c6, c7, and c8 but it is to be understood that the number of channels may vary significantly as is known in the art.

It is important to note that the present invention has the ability of using different channels to transmit a network connection over the optical network. For example, several channels may be used to transmit network connection 201 over the working fibers as further explained below. This is possible at least in part due to the channel assignment database 300 that keeps track of which channels the network connection(s) utilize on each span of the network.

In FIG. 2a, a uni-directional network connection 201 is established from switching node B to switching node E, and a uni-directional network connection 202 is established from switching node E to switching node B. The choice of uni-direction network connections eases the explanation of the invention but it is to be understood that bi-directional network connections are within the scope of the invention.

By way of example, network connection 201 can traverse working fiber 220 on channel c3, working fiber 230 on channel c5, and working fiber 240 on channel c2. Network connection 202 can traverse working fiber 250 on channel c2 and working fiber 210 on channel c3. Thus, multiple channels may be used to transmit each of the network connections 201, 202 over the working fibers.

Switching nodes B and E are, respectively, the ingress and the egress switching nodes of network connection 201. Switching nodes E and B are, respectively, the ingress and the egress switching nodes of network connection 202.

In FIG. 2b, network connection 201 and network connection 202 are reestablished after a span failure occurs between switching nodes C and D. After the span failure, network connection 201 traverses working fiber 220 on channel c3, protection fibers 225, 215, 245, and 255 on channel c5, and working fiber 240 on channel c2. After the span failure, the path traversed by network connection 202 is unchanged. To reestablish network connection 201, switching node C performs a line switching operation to connect working fiber 220 with protection fiber 225, and switching node D performs a line switching operation to connect protection fiber 245 with working fiber 240.

Switching node B is configured to pass through optical signals received from protection fiber 225 to protection fiber 215. Switching node A is configured to pass through optical signals received from protection fiber 215 to protection fiber 255. Switching node E is configured to pass through optical signals received from protection fiber 255 to protection fiber 245. Switching nodes A, B, and E can be configured to perform a pass-through operation before the span failure or after the span failure.

When a switching node includes a stored network connection table or database with each node and also having a controller unit such as a microprocessor and is informed which span fails, the switching node will be able to determine which channel needs to be dropped or passed through to maintain the network connection (201, 202).

Figure 4:
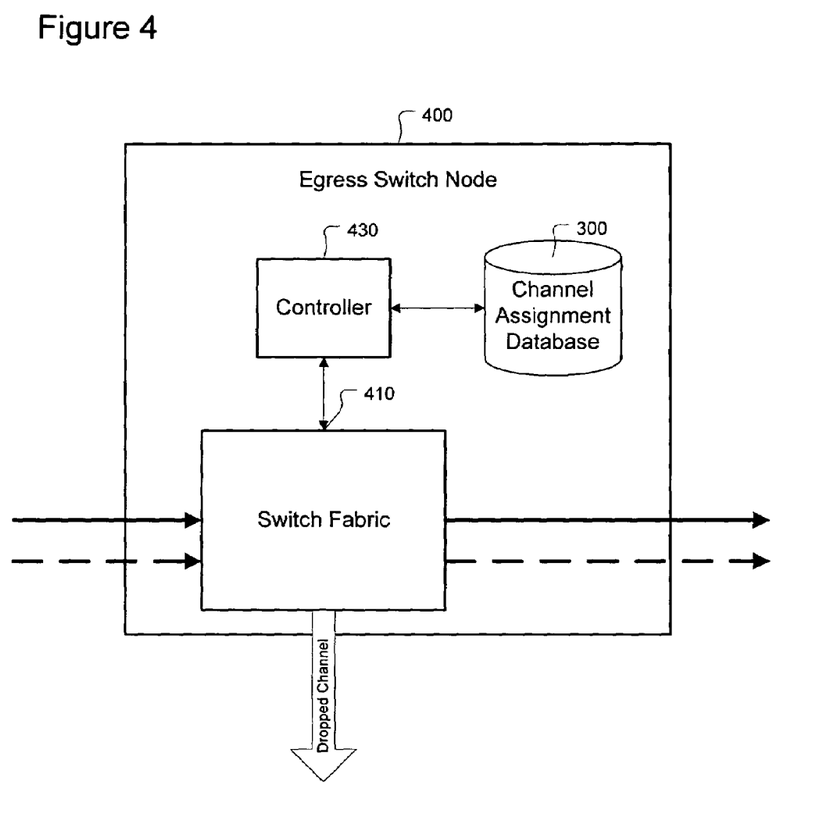
FIG. 4 is a high-level block diagram of such a switching node construction according to the invention.

FIG. 4 is a high-level block diagram of such a switching node construction according to the invention. The switching node 400 shown in FIG. 4 is an egress switching node because it has a dropped channel pathway and associated, conventional hardware in the switch fabric 410 for this purpose. As shown therein, the egress switch node 400 preferably includes a controller 430 that may be constructed with a microprocessor, ASIC, general purpose computer programmed according to the inventive methods or the like. Controller 430 is operatively connected to the conventional switch fabric 410 and to a channel assignment database 300. Other switch nodes may have a similar construction but do not necessarily include a dropped channel pathway and associated hardware since many switch nodes do not need and are not configured to drop channel(s). The controller 430 may be programmed or constructed to operate as described below and generally shown in the figures, particularly FIG. 5.

Figure 3A:
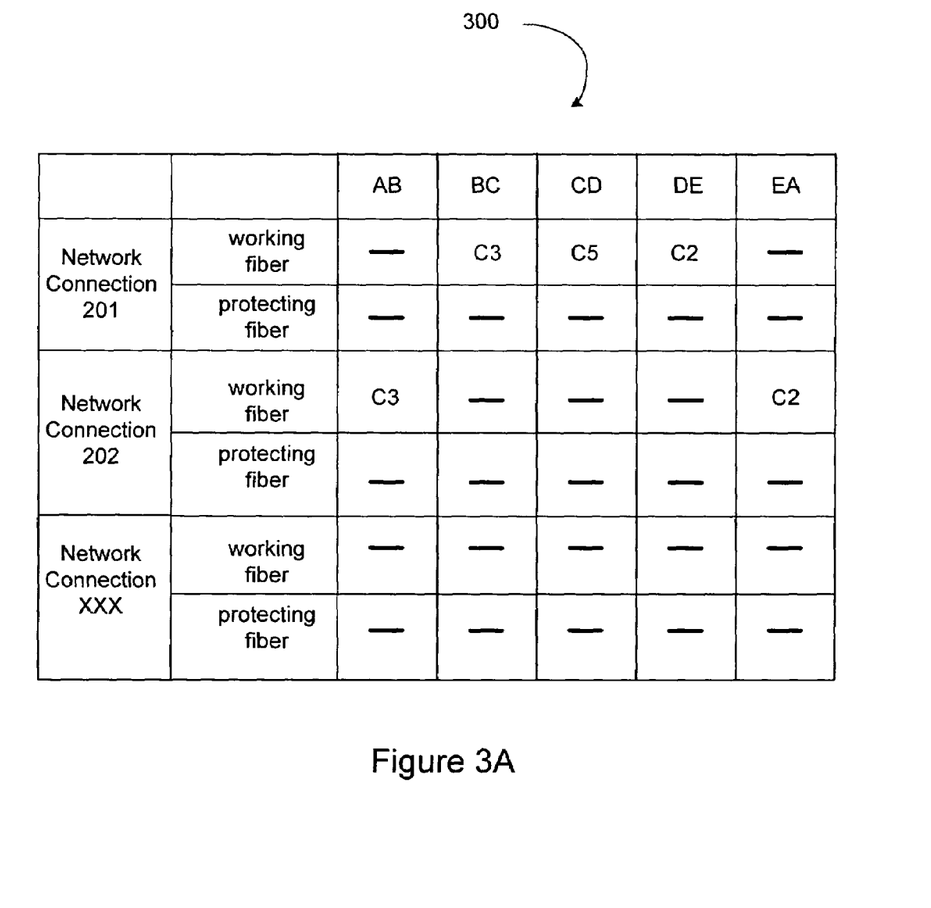
FIG. 3a shows the channel assignments in an embodiment of the present invention for network connections 201 and 202 as part of a stored network connection database.

FIG. 3a shows the channel assignments for network connections 201 and 202 as part of the stored channel assignment database 300 before a span failure. The network connection or channel assignment database 300 lists the channel assigned to each span used by each network connection. Network connection 201 uses channel c3 between switching nodes B and C, channel c5 between C and D, and channel c2 between D and E. Network connection 202 uses channel c2 between switching nodes E and A, and channel c3 between A and B.

Figure 3B:
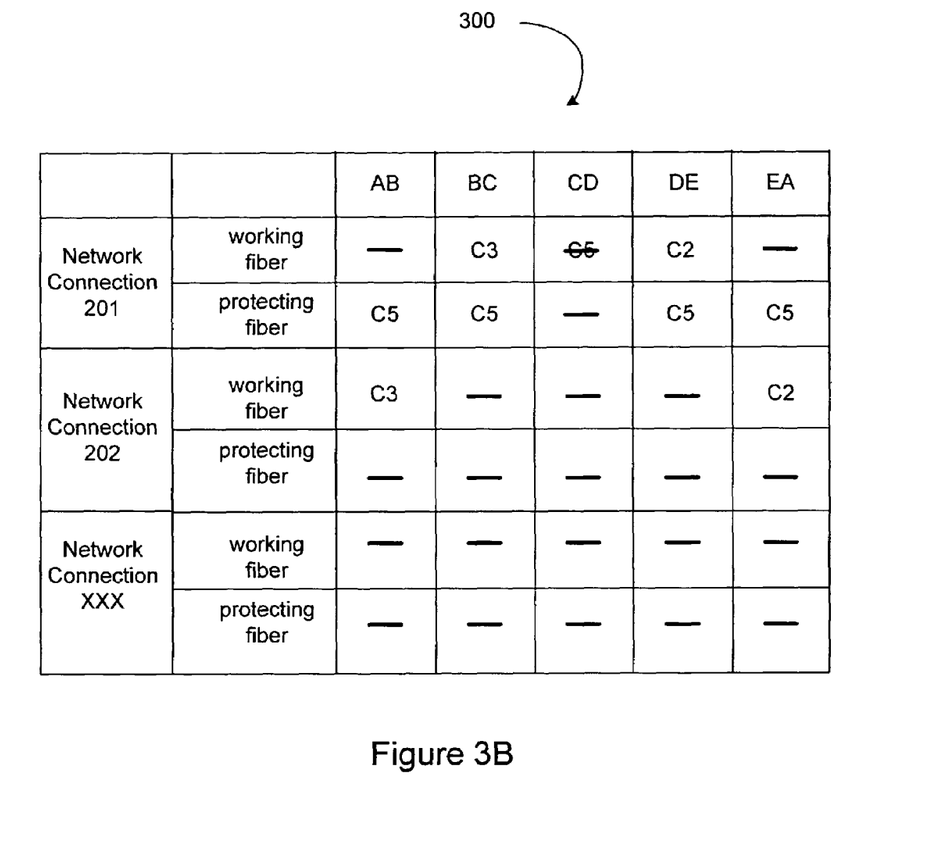
FIG. 3b shows the channel assignments in an embodiment of the present invention for network connections 201 and 202 as part of the stored network connection database after the span between switching nodes C and D fails.

After a span between switching nodes C and D fails, switching node C and switching node D perform line switching operations, and the channel assignments for network connections 201 and 202 can be changed accordingly. FIG. 2b shows network connection 201 and network connection 202 after the span failure, along with the corresponding channel assignment. FIG. 3b shows the corresponding channel assignments for network connections 201 and 202 as part of the stored network connection table 300. Network connection 201 uses channel c3 on the working line between nodes B and C, channel c5 on the protection line between C and B, channel c5 on the protection line between B and A, channel c5 on the protection line between A and E, channel c5 on the protection line between E and D, and channel c2 on the working line between nodes D and E. Network connection 202 still uses channel c2 on the working line between switching nodes E and A, and channel c3 on the working line between A and B.

In FIG. 3b, channel c5 in strikethrough character is the channel on the working fiber used by network connection 201 before the span between switching nodes C and D fails. After switching node C performs a line switching operation, channel c5 on the protection fiber can be used on all the spans for reestablishing network connection 201 (i.e., between C and B, B and A, A and E, and E and D).

Figure 3C:
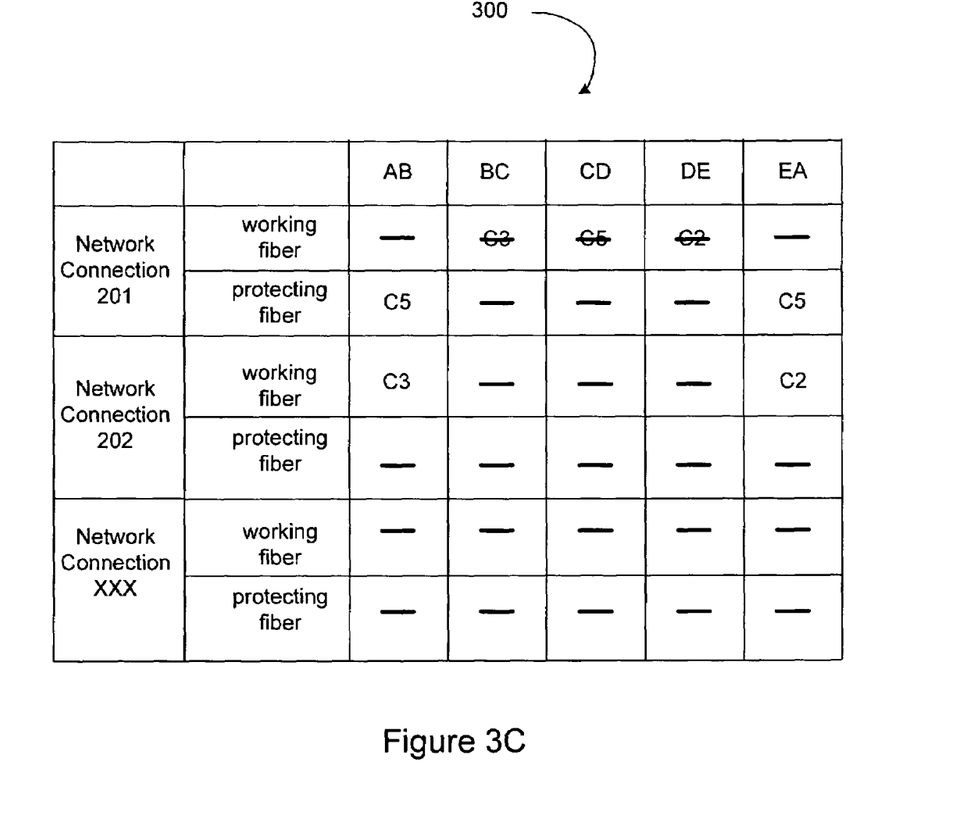
FIG. 3c shows the channel assignments in an embodiment of the present invention for network connections 201 and 202 as part of the stored network connection database after the span between switching nodes C and D fails.

FIGS. 2c and 3c illustrate a preferred embodiment of the invention by showing that an egress switching node can determine which channel should be dropped once the switching node is informed with the identity of a failed span. In FIG. 2c, the failed span is between switching nodes C and D. Channel c5 is the channel on the working fiber 230 used by network connection 201 before the span failure. FIG. 3c shows that, after switching node B performs a line switching operation, channel c5 on the protection fibers 215 and 255 can be used for reestablishing network connection 201. In addition, channel c5 on the protection fiber 255 is the channel that needs to be dropped out by egress switching node E. Nodes B and E connect the drop sides of the connection directly to the protect fibers 215 and 255, thereby saving the latency time for the signal to cross fibers 220, 225, 245, and 240. If nodes A and E, for example, are physically located on one side of an ocean (or other long distance) and nodes B, C, and D are on the other side then the connection will only cross the ocean (or other long distance) once during a ring switch using this approach.

In general, when a given span fails, the egress switching node of a network connection should drop or otherwise output a channel on the protection fiber rather than the working fiber in order to provide a shorter optical pathway for the restored network connection. Accordingly, as further shown in FIG.

2C, traffic on network connection 201 is routed along a shorter path through nodes B, A, and E, and does not propagate along a longer path through E, D and back to E before exiting at E as in FIG. 1B. In one implementation, the channel that should be dropped on a protection fiber is the channel assigned to the network connection on the working fiber in the failed span before a span failure. The channel that needs to be dropped by the egress switching node can be easily determined if the egress switching node is informed which span fails and also stores a channel assignment that lists the channel assigned to the network connection on each span used by the network connection.

Alternatively, the channel that should be dropped from the protection fiber (and, likewise the channel used for the network connection on the protecting fibers) may be chosen from available channels but this complicates the channel arbitration and is generally not preferred as a result. Channel arbitration to determine which channel is available may be determined according to the channel assignment databases 300. In another alternative, one or more channels may be dedicated for protecting switched traffic on the protecting fibers such that no channel availability determination is necessary but this ties up bandwidth and is not preferred. The preferred method utilizes the channel assigned to network connection on the failed span. With the channel assignment database and the notification of which span failed, each switching node can quite efficiently configure passthrough (for the network connection on the protecting fibers) and drop (at the egress switching node and from the protecting fiber).

Figure 5:
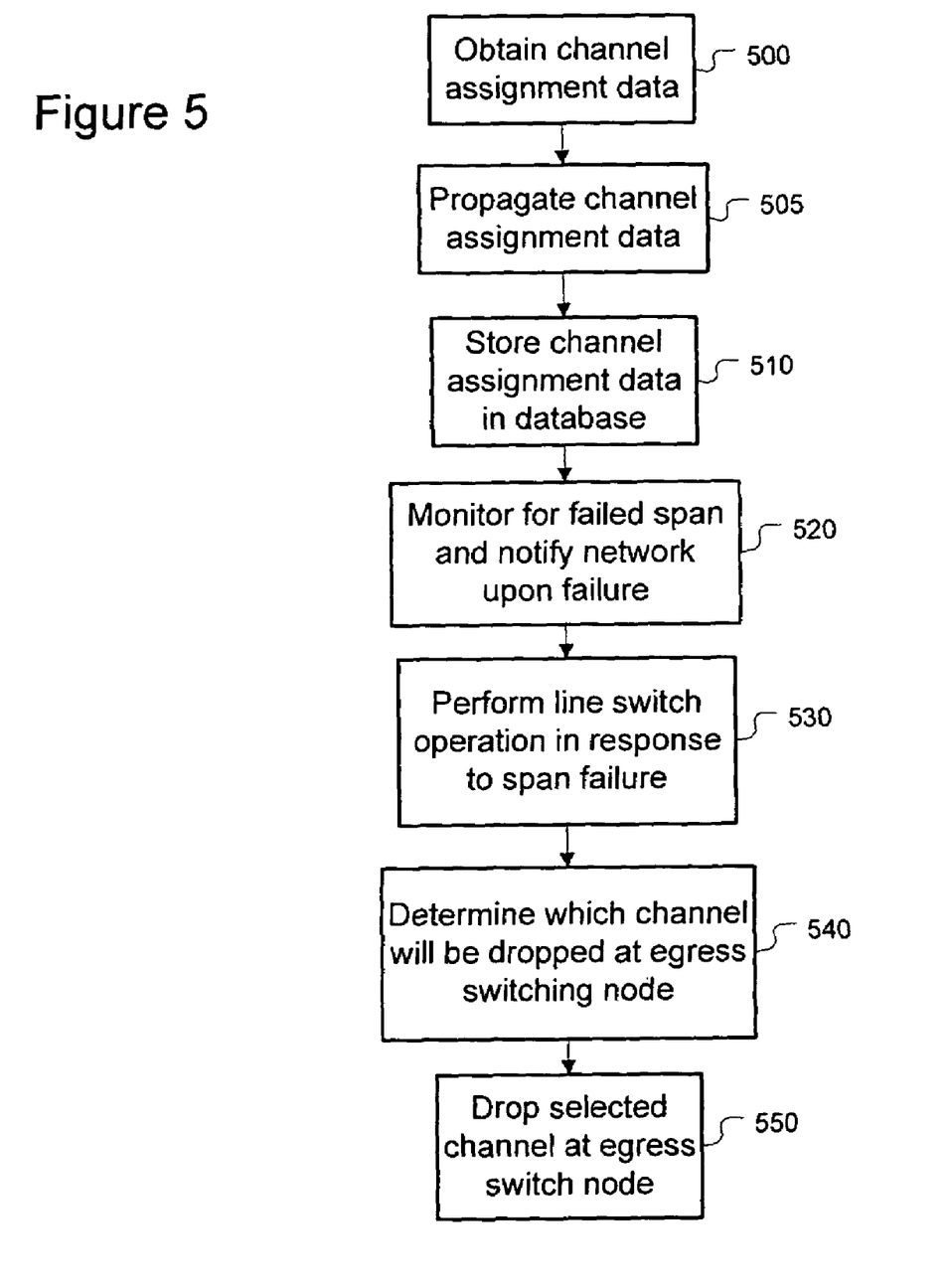
FIG. 5 is a high-level flowchart illustrating the inventive methodologies for maintaining a network connection.

FIG. 5 illustrates a methodology according to the invention that may be utilized by the optical switches to maintain network connections in the event of a failed span. As shown therein, the switching nodes obtain (500) channel assignment data as further described below. This channel assignment data is stored (510) in the channel assignment database 300 of each switching node or at least the egress switch node 400. The switch nodes monitor (520) the optical ring network for a failed span and notify the network upon failure, as also described below in more detail. In response to failed span, the switch nodes on either side of the failed span perform (530) a line switching operation as illustrated in the figures. The method then determines (540) which channel should be dropped from the egress node 400. In response to this determination (540) the egress node drops (550) the selected channel so determined (540).

In a typical optical network, there may be a large number of network connections each of which may have a different egress switching node. Of course, the inventive methodology extends to such a plurality of network connections. Alterations to the methodology for one network connection to handle multiple connections include obtaining channel assignment data including the channels assigned to each of the network connections on each of the plurality of spans used by the network connections; performing a switching operation in response to the notification in order to switch the network connections to the protecting fibers; determining which channels the network connections utilized on the failed span based on the channel assignment data and the notification of the failed span; and dropping the channels selected by said determining step from the protecting fiber at the egress switching node(s).

The channel assignment stored in a channel assignment database 300 on each switching node in an optical fiber ring can be created or otherwise obtained with various methodologies. As one non-limiting example, the Optical Signal and Routing Protocol ("OSRP") that is commonly owned by the assignee of the present invention can be utilized to collect the configuration information of each switching node on the optical fiber ring. Further details of OSRP may be found in copending application Ser. No. 09/259,263 filed Mar. 1, 1999 which is hereby incorporated by reference in its entirety. OSRP uses, for example, a DCC or an overhead channel for this purpose. Alternatively, the configuration information of each switching node on the optical fiber ring can be sent to other switching nodes on the optical fiber network using an out-of-band protocol, service channel or overlay IP network.

The method of propagating the channel assignment data to the switches nodes may also be performed with a variety of techniques. One nonlimiting example is the Connection State Distribution Protocol ("CSDP") that is commonly owned by the assignee of the present invention. Further details of CSDP may be found in copending application Ser. No. 09/904,623 filed Jul. 13, 2001 which is hereby incorporated by reference in its entirety.

The method of informing or notifying each switching node a failed span is an optical fiber ring can depend on the type of optical fiber ring. If the optical fiber rings is a SONET ("Synchronous Optical Network") ring or a SDH ("Synchronous Digital Hierarchy") ring, a K-byte in the SONET/SDH frame can be used. CSDP uses, for example, a DCC or an overhead channel for this purpose. Alternatively, the channel assignment data may be propagated to each switching node on the optical fiber network using an out-of-band protocol, service channel or overlay IP network.

In FIG. 2b, if bi-directional line switch ring 200 uses SONET/SDH frames for data transmissions, the K-byte in the SONET/SDH frame can be used to inform or otherwise notify all other switching nodes the identity of a failed span. When the span between switching nodes C and D fails, switching node D will fail to receive SONET/SDH frames, and switching node D can inform others of this failed condition by sending SONET/SDH frames to the other switching nodes with the K-byte coded with the identity of the failed span. SONET/SDH STS-1/STM-1 and K-byte signaling is provided as an embodiment of the invention as an example; it is possible for one skilled in the art to extend the concepts taught herein to other signaling formats and data pathways. For example, the notification of failed span may be sent to each switching node on the optical fiber network using an out-of-band protocol, service channel or overlay IP network.

When switching node C receives the SONET/SDH frames including the K-byte coded with the failure condition, switching node C can perform a line switching operation to reroute the optical signals received from working fiber 220 to protection fiber 225.

When switching node E receives the SONET/SDH frames including the K-byte coded with the failure condition, switching node E can perform a channel drop operation to drop out channel c5 from protection fiber 255. Switching node E has obtained information from the K-byte that the failed span is between switching nodes C and D. Switching node E also has information from the stored channel assignment that channel c5 is used between switching nodes C and D for network connection 201 before the failure. Therefore, switching node E has information that channel c5 should be dropped to reestablish network connection 201.

In addition, if bi-directional line switch ring 200 uses SONET/SDH frames for data transmissions, each channel can include one or more synchronous transport signals of level N (STS-N). In one implementation, each channel includes one STS-1. If bi-directional line switch ring 200 uses WDM techniques for data transmissions, each channel can include optical signals with one or more wavelengths.

In FIG. 2b, switching node C performs a line switching operation to connect working fiber 220 to protection fiber 225. In another implementation, switching node C can perform a switching operation that selectively passes the optical signals on channel c3 on working fiber 220 to channel c5 on protection fiber 225. Switching node C can leave some other channel connections unchanged.

In FIG. 2b, when switching nodes A, B, and E perform a pass-through operation, switching nodes A, B, and E can be configured to pass through all channels in a protection fiber to another protection fiber. Switching nodes A, B, and E can also be configured to selectively pass through only the channels that are required to reestablish network connections.

In the above, using bi-directional line switch ring 200 as an example, methods for reestablishing network connections after span failures are described. The methods for reestablishing network connections after span failures described above can also be used in other types of optical fiber rings.

Embodiments of the present invention provide methods for reestablishing network connections in an optical fiber ring after a span in the optical fiber ring fails. One of the applications of the present invention is to improve the performance of an optical fiber ring when some of the switching nodes are separated by large distances.

Using bi-directional line switch ring 100 in FIG. 1b as an example, if switching nodes A and E are separated from switching nodes B, C, and D by an ocean (e.g., the Atlantic Ocean) or other long distance, then, optical signals in reestablished network connection 101 travel across the ocean three times: the optical signals first travel across the ocean from switching node A to switching node B, then from switching node E to switching node D, and finally from switching node D to switching node E. On the other hand, when network connection 201 is reestablished using the methods described above, as shown in FIG. 2b, optical signals in reestablished network connection 201 travel across the ocean only once from switching node B to switching node A. Other applications of embodiments of the present invention can be readily recognized by people skilled in the art.

For example, the inventive methods, systems, and egress switch node is not limited to optical ring networks and may be extended to mesh networks in which the optical switches are connected in a mesh topology. Indeed, the inventive method of obtaining, propagating, and storing channel assignment data may be used in a mesh network in much the same fashion as a ring network. By propagating the channel assignment data to each of the switching nodes in a mesh topology each node will have the ability to determine proper channel assignments upon span failure. For example, the notification of a failed span would be sent to all switching nodes, or at least those affected by the failure. The notification identifies the failed span which the controller may then use to look up which channel was assigned to the failed working span. This channel is then selected for the protecting switch to reroute the network connection and drop the appropriate channel from the protecting fiber at the egress node.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A method of maintaining a network connection in an optical network, comprising:
    obtaining channel assignment data comprising which channel of a plurality of channels is assigned to the network connection on each of a plurality of spans used by the network connection, wherein the optical network comprises a plurality of switching nodes and an egress switching node in one of a ring and a mesh topology, the plurality of spans comprising working and protecting fibers operatively connecting the plurality of switching nodes and carrying the plurality of channels;
    propagating the channel assignment data to the plurality of switching nodes in the optical network through one of an overhead data channel, an out-of-band protocol, a service channel, and an overlay IP network;
    storing, at each of the plurality of switching nodes, the channel assignment data;
    monitoring the optical network for a failed span between two switching nodes of the plurality of switching nodes and notifying the optical network in response to the failed span, wherein the two switching nodes perform a line switching operation in response to the notification in order to switch the network connection to the protecting fiber;
    determining at the egress node which channel the network connection utilized on the failed span based on the channel assignment data and the notification of the failed span, wherein the channel assignment data and the notification of the failed span are utilized to efficiently configure which channel to drop responsive to the failed span, and wherein the channel is determined by the determining step responsive to the stored channel assignment data when the failed span occurs; and
    dropping the channel selected by said determining step from the protecting fiber at the egress switching node, wherein the determining and dropping steps are performed following the line switching operation.

2. The method according to claim 1, wherein the channels are wavelength division multiplexed channels and the optical network is a wavelength division multiplexed optical network.

3. The method according to claim 1, wherein the channels are time division multiplexed channels and the optical network is a time division multiplexed optical network.

4. The method according to claim 1, wherein the channels are time division multiplexed channels at least some of which are carried over different wavelengths and where the optical network is a TDM over WDM network.

5. The method according to claim 1, wherein the optical network is compliant with SONET ("Synchronous Optical Network") or SDH ("Synchronous Digital Hierarchy") protocols, said notifying step utilizing a K-byte in a SONET/SDH frame to notify the optical network of the span failure and an identity of the failed span.

6. The method according to claim 1, wherein the optical network is a ring network wherein the switching nodes perform a line switching operation in response to the notification in order to switch the network connection to the protecting fibers.

7. The method according to claim 1, wherein the method maintains a plurality of network connections,
    said obtaining step obtaining channel assignment data including the channels assigned to each of the network connections on each of the plurality of spans used by the network connections;
    said monitoring step monitoring the optical network for a failed span and notifying the optical network in response to the failed span, wherein the switching nodes perform a line switching operation in response to the notification in order to switch the network connections to the protecting fibers, and wherein the line switching is performed between two nodes of the plurality of switching nodes adjacent to the failed span;

determining which channels the network connections utilized on the failed span based on the channel assignment data and the notification of the failed span; and dropping the channels selected by said determining step from the protecting fiber at the egress switching node(s).

8. An egress optical switch node, comprising:

a channel assignment database comprising which channel of a plurality of channels is assigned to a network connection on each of a plurality of spans used to the network connection; and a controller operatively connected to said channel assignment database, said controller configuring the egress optical switch node to drop a selected channel from the protecting fiber in response to a line switch operation on an optical network, wherein the line switch operation comprises switching nodes on either side of a failed span performing a line switch, and wherein the selected channel is dropped from the protecting fiber following the line switch operation;

said controller determining the selected channel in response to the line switch operation by accessing the channel assignment database and according to which channel was utilized by the network connection on a working fiber of the failed span that triggered the switch operation, wherein the channel assignment database is utilized to efficiently configure which channel to drop responsive to the failed span, and wherein the selected channel is determined by the controller responsive to the channel assignment data when the failed span occurs;

wherein the egress optical switch node is operatively connected to the optical network carrying the network connection using the plurality of channels and over a plurality of switching nodes connected by the plurality of spans including working and protecting fibers;

wherein channel assignments in said channel assignment database are propagated to said optical egress switch node through one of an overhead data channel, an out-of-band protocol, a service channel, and an overlay IP network; and wherein the optical network comprises one a ring and a mesh topology.

9. The egress optical switch node according to claim 8, said controller obtaining channel assignment data including the channels assigned to the network connection on each of the plurality of spans used by the network connection;

said controller storing the channel assignment data in the channel assignment database;

said controller receiving a notification from the optical network in response to the switching operation;

said controller determining the selected channel according to which of the channels the network connection utilized on the failed span based on the channel assignment data and the received notification of the failed span, wherein the egress optical switch node drops the selected channel selected by said determining step onto the protecting fiber at the egress switching node.

10. The egress optical switch node according to claim 9, wherein the optical network is a ring network, wherein the switching nodes perform a line switching operation in response to the notification in order to switch the network connection to the protecting fibers.

11. The egress optical switch node according to claim 8, wherein the channels are wavelength division multiplexed channels and the optical network is a wavelength division multiplexed optical network.

12. The egress optical switching node according to claim 8, wherein the channels are time division multiplexed channels and the optical network is a time division multiplexed optical network.

13. The egress optical switch node according to claim 8, wherein the channels are time division multiplexed channels at least some of which are carried over different wavelengths and wherein the optical network is a TDM over WDM optical network.

14. The egress optical switch node according to claim 8, wherein the egress optical switch node is in an optical fiber ring is compliant with SONET ("Synchronous Optical Network") or SDH ("Synchronous Digital Hierarchy") protocols, said controller receiving a K-byte in a SONET/SDH frame as the notification.

15. An optical network including an egress optical switch node according to claim 8.

* * * * *